US010735805B2

(12) United States Patent
Sargent (10) Patent No.: US 10,735,805 B2
(45) Date of Patent: *Aug. 4, 2020

(54) APPLICATION TRIGGERING (71) Applicant: Comcast Cable Communications, LLC, Philadelphia, PA (US)

(72) Inventor: Darren Sargent, San Rafael, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,135

(22) Filed: Sep. 26, 2016

(65) Prior Publication Data
US 2017/0238054 A1    Aug. 17, 2017

Related U.S. Application Data (63) Continuation of application No. 14/554,258, filed on Nov. 26, 2014, now Pat. No. 9,485,547, which is a
(Continued)

(51) Int. Cl.
*H04N 21/23* (2011.01)
*H04N 21/44* (2011.01)
(Continued)

(52) U.S. Cl.
CPC ..... *H04N 21/44008* (2013.01); *G06F 16/583* (2019.01); *G06F 16/783* (2019.01);
(Continued)

(58) Field of Classification Search
None
See application file for complete search history.

(56) References Cited

U.S. PATENT DOCUMENTS 4,647,974 A    3/1987    Butler et al.
5,469,206 A    11/1995   Strubbe et al.
(Continued)

FOREIGN PATENT DOCUMENTS

DE    60217091 T2    6/2007
EP    0915621 B1    5/1999
(Continued)

OTHER PUBLICATIONS

Morris S: "The MHP Tutorial", Internet Citation, 2002, XP002281053, retrieved from the Internet: URL: http://www.mhp-interactive.org/tutorials/mhp/printerfriendly/ (retrieved on May 19, 2004).
(Continued)

*Primary Examiner* — Cai Y Chen
(74) *Attorney, Agent, or Firm* — Banner & Witcoff, Ltd.

(57) ABSTRACT

An apparatus, method, system and computer-readable medium are disclosed for, in one aspect, determining when a trigger, such as an application trigger, should be generated. In some embodiments, the application trigger may be generated when a frame included in a feed (e.g., a content feed) matches a specified or indicated frame. In some embodiments, a comparison between the feed and the specified or indicated frame may be based on one or more tolerances or thresholds. In some embodiments, the feed may be split and content (e.g., video) obtained via the split may be combined (e.g., multiplexed) with a trigger. The combined content and trigger may be transmitted to one or more devices, such as one or more user devices.

20 Claims, 4 Drawing Sheets

Related U.S. Application Data continuation of application No. 13/217,342, filed on Aug. 25, 2011, now Pat. No. 8,935,719.

(51) Int. Cl.
| | | |
|---|---|---|
| *G06F 16/583* | (2019.01) | |
| *G06F 16/783* | (2019.01) | |
| *H04N 21/236* | (2011.01) | |
| *H04N 21/488* | (2011.01) | |
| *H04N 21/81* | (2011.01) | |
| *H04N 21/858* | (2011.01) | |
| *H04N 21/234* | (2011.01) | |
| *H04N 21/8545* | (2011.01) | |
| *H04N 21/478* | (2011.01) | |
| *H04N 21/442* | (2011.01) | |

(52) U.S. Cl.
CPC . *H04N 21/23418* (2013.01); *H04N 21/23614* (2013.01); *H04N 21/442* (2013.01); *H04N 21/478* (2013.01); *H04N 21/488* (2013.01); *H04N 21/8126* (2013.01); *H04N 21/8166* (2013.01); *H04N 21/858* (2013.01); *H04N 21/8545* (2013.01)

(56) References Cited

U.S. PATENT DOCUMENTS

| | | |
|---|---|---|
| 5,485,221 A | 1/1996 | Banker et al. |
| 5,563,648 A | 10/1996 | Menand et al. |
| 5,579,057 A | 11/1996 | Banker et al. |
| 5,592,551 A | 1/1997 | Lett et al. |
| 5,600,364 A | 2/1997 | Hendricks et al. |
| 5,631,694 A | 5/1997 | Aggarwal et al. |
| 5,671,377 A | 9/1997 | Bleidt et al. |
| 5,689,799 A | 11/1997 | Dougherty et al. |
| 5,706,434 A | 1/1998 | Kremen et al. |
| 5,708,845 A | 1/1998 | Wistendahl et al. |
| 5,727,159 A | 3/1998 | Kikinis |
| 5,742,680 A | 4/1998 | Wilson |
| 5,774,660 A | 6/1998 | Brendel et al. |
| 5,774,664 A | 6/1998 | Hidary et al. |
| 5,774,666 A | 6/1998 | Portuesi |
| 5,809,242 A | 9/1998 | Shaw et al. |
| 5,818,438 A | 10/1998 | Howe et al. |
| 5,819,269 A | 10/1998 | Uomini |
| 5,826,258 A | 10/1998 | Gupta et al. |
| 5,848,396 A | 12/1998 | Gerace |
| 5,872,588 A | 2/1999 | Aras et al. |
| 5,881,284 A | 3/1999 | Kubo |
| 5,895,477 A | 4/1999 | Orr et al. |
| 5,907,322 A | 5/1999 | Kelly et al. |
| 5,925,595 A | 7/1999 | Seitz et al. |
| 5,929,849 A | 7/1999 | Kikinis |
| 5,937,331 A | 8/1999 | Kalluri et al. |
| 5,961,603 A | 10/1999 | Kunkel et al. |
| 5,969,715 A | 10/1999 | Dougherty et al. |
| 5,982,445 A | 11/1999 | Eyer et al. |
| 5,991,306 A | 11/1999 | Burns et al. |
| 6,002,394 A | 12/1999 | Schein et al. |
| 6,006,256 A | 12/1999 | Zdepski et al. |
| 6,008,836 A | 12/1999 | Bruck et al. |
| 6,014,134 A | 1/2000 | Bell et al. |
| 6,014,502 A | 1/2000 | Moraes |
| 6,018,764 A | 1/2000 | Field et al. |
| 6,018,768 A | 1/2000 | Ullman et al. |
| 6,025,837 A | 2/2000 | Matthews, III et al. |
| 6,029,045 A | 2/2000 | Picco et al. |
| 6,049,333 A | 4/2000 | LaJoie et al. |
| 6,055,566 A | 4/2000 | Kikinis |
| 6,061,056 A * | 5/2000 | Menard ............... H04N 5/4401 348/E5.108 |
| 6,067,107 A | 5/2000 | Travaille et al. |
| 6,076,734 A | 6/2000 | Dougherty et al. |
| 6,101,510 A | 8/2000 | Stone et al. |
| 6,122,658 A | 9/2000 | Chaddha |
| 6,169,543 B1 | 1/2001 | Wehmeyer |
| 6,177,931 B1 | 1/2001 | Alexander et al. |
| 6,182,072 B1 | 1/2001 | Leak et al. |
| 6,188,398 B1 | 2/2001 | Collins-Rector et al. |
| 6,205,582 B1 | 3/2001 | Hoarty |
| 6,209,130 B1 | 3/2001 | Rector, Jr. et al. |
| 6,219,042 B1 | 4/2001 | Anderson et al. |
| 6,230,319 B1 | 5/2001 | Britt, Jr. et al. |
| 6,233,546 B1 | 5/2001 | Datig |
| 6,233,592 B1 | 5/2001 | Schnelle et al. |
| 6,237,022 B1 | 5/2001 | Bruck et al. |
| 6,240,555 B1 | 5/2001 | Shoff et al. |
| 6,253,238 B1 | 6/2001 | Lauder et al. |
| 6,263,501 B1 | 7/2001 | Schein et al. |
| 6,275,989 B1 | 8/2001 | Broadwin et al. |
| 6,295,058 B1 | 9/2001 | Hsu et al. |
| 6,297,853 B1 | 10/2001 | Sharir et al. |
| 6,301,584 B1 | 10/2001 | Ranger |
| 6,308,206 B1 | 10/2001 | Singh |
| 6,327,574 B1 | 12/2001 | Kramer et al. |
| 6,338,094 B1 | 1/2002 | Scott et al. |
| 6,345,292 B1 | 2/2002 | Daugherty et al. |
| 6,357,042 B2 | 3/2002 | Srinivasan et al. |
| 6,363,525 B1 | 3/2002 | Dougherty et al. |
| 6,373,609 B1 | 4/2002 | Mizrahi |
| 6,415,303 B1 | 7/2002 | Meier et al. |
| 6,424,717 B1 | 7/2002 | Pinder et al. |
| 6,430,624 B1 | 8/2002 | Jamtgaard et al. |
| 6,434,747 B1 | 8/2002 | Khoo et al. |
| 6,446,261 B1 | 9/2002 | Rosser |
| 6,457,103 B1 | 9/2002 | Challenger et al. |
| 6,459,427 B1 | 10/2002 | Mao et al. |
| 6,460,180 B1 | 10/2002 | Park et al. |
| 6,471,392 B1 | 10/2002 | Hall et al. |
| 6,473,609 B1 | 10/2002 | Schwartz et al. |
| 6,473,858 B1 | 10/2002 | Shimomura et al. |
| 6,496,981 B1 | 12/2002 | Wistendahl et al. |
| 6,510,557 B1 | 1/2003 | Thrift |
| 6,513,019 B2 | 1/2003 | Lewis |
| 6,513,069 B1 | 1/2003 | Abato et al. |
| 6,513,160 B2 | 1/2003 | Dureau |
| 6,515,349 B2 | 2/2003 | Terashima |
| 6,516,349 B1 | 2/2003 | Lieberman |
| 6,518,950 B1 | 2/2003 | Dougherty et al. |
| 6,530,082 B1 | 3/2003 | Del Sesto et al. |
| 6,536,041 B1 | 3/2003 | Knudson et al. |
| 6,542,593 B1 | 4/2003 | Bowman-Amuah |
| 6,546,488 B2 | 4/2003 | Dillon et al. |
| 6,547,754 B1 | 4/2003 | Evans et al. |
| 6,553,409 B1 | 4/2003 | Zhang et al. |
| 6,564,251 B2 | 5/2003 | Katariya et al. |
| 6,564,263 B1 | 5/2003 | Bergman et al. |
| 6,571,392 B1 | 5/2003 | Zigmond et al. |
| 6,574,793 B1 | 6/2003 | Ngo et al. |
| 6,574,795 B1 | 6/2003 | Carr |
| 6,577,346 B1 | 6/2003 | Perlman |
| 6,584,153 B1 | 6/2003 | Gordon et al. |
| 6,601,103 B1 | 7/2003 | Goldschmidt Iki et al. |
| 6,614,914 B1 | 9/2003 | Rhoads et al. |
| 6,615,408 B1 | 9/2003 | Kaiser et al. |
| 6,637,032 B1 | 10/2003 | Feinleib |
| 6,640,145 B2 | 10/2003 | Hoffberg et al. |
| 6,643,652 B2 | 11/2003 | Helgeson et al. |
| 6,651,218 B1 | 11/2003 | Adler et al. |
| 6,654,754 B1 | 11/2003 | Knauft et al. |
| 6,668,378 B2 | 12/2003 | Leak et al. |
| 6,675,350 B1 | 1/2004 | Abrams et al. |
| 6,676,350 B1 | 1/2004 | McSherry et al. |
| 6,681,393 B1 | 1/2004 | Bauminger et al. |
| 6,698,020 B1 | 2/2004 | Zigmond et al. |
| 6,698,023 B2 | 2/2004 | Levitan |
| 6,718,551 B1 | 4/2004 | Swix et al. |
| 6,725,461 B1 | 4/2004 | Dougherty et al. |
| 6,730,624 B2 | 5/2004 | Motoki et al. |
| 6,735,487 B1 | 5/2004 | Marshall et al. |
| 6,742,043 B1 | 5/2004 | Moussa et al. |
| 6,745,368 B1 | 6/2004 | Boucher et al. |

(56) References Cited

U.S. PATENT DOCUMENTS

| | | | |
|---|---|---|---|
| 6,750,919 B1 | 6/2004 | Rosser | |
| 6,756,997 B1 | 6/2004 | Ward, III et al. | |
| 6,757,708 B1 | 6/2004 | Craig et al. | |
| 6,779,154 B1 | 8/2004 | Nussbaum et al. | |
| 6,785,902 B1 | 8/2004 | Zigmond et al. | |
| 6,792,616 B1 | 9/2004 | Jerding et al. | |
| 6,799,326 B2 | 9/2004 | Boylan, III et al. | |
| 6,799,327 B1 | 9/2004 | Reynolds et al. | |
| 6,810,526 B1 | 10/2004 | Menard et al. | |
| 6,813,372 B2* | 11/2004 | Standridge | H04N 7/148 348/E7.082 |
| 6,826,597 B1 | 11/2004 | Lonnroth et al. | |
| 6,839,903 B1 | 1/2005 | Shintani et al. | |
| 6,847,969 B1 | 1/2005 | Mathai et al. | |
| 6,925,595 B1 | 8/2005 | Whitledge et al. | |
| 6,934,963 B1 | 8/2005 | Reynolds et al. | |
| 6,938,270 B2 | 8/2005 | Blackketter et al. | |
| 6,941,474 B2 | 9/2005 | Boies et al. | |
| 6,941,574 B1 | 9/2005 | Broadwin et al. | |
| 7,028,327 B1 | 4/2006 | Dougherty et al. | |
| 7,062,777 B2 | 6/2006 | Alba et al. | |
| 7,079,176 B1 | 7/2006 | Freeman et al. | |
| 7,080,039 B1 | 7/2006 | Marsh | |
| 7,100,183 B2 | 8/2006 | Kunkel et al. | |
| 7,103,605 B1 | 9/2006 | Hazi et al. | |
| 7,103,904 B1 | 9/2006 | Blackketter et al. | |
| 7,143,042 B1 | 11/2006 | Sinai et al. | |
| 7,143,428 B1 | 11/2006 | Bruck et al. | |
| 7,168,084 B1 | 1/2007 | Hendricks et al. | |
| 7,222,155 B1 | 5/2007 | Gebhardt et al. | |
| 7,222,163 B1 | 5/2007 | Girouard et al. | |
| 7,287,018 B2 | 10/2007 | Lennon | |
| 7,394,816 B1 | 7/2008 | Bill | |
| 7,500,188 B1 | 3/2009 | Trapani et al. | |
| 7,500,195 B2 | 3/2009 | Sahota et al. | |
| 7,512,799 B1 | 3/2009 | Chow et al. | |
| 7,530,016 B2 | 5/2009 | Sahota et al. | |
| 7,631,338 B2 | 12/2009 | Del Sesto et al. | |
| 7,634,787 B1 | 12/2009 | Gebhardt et al. | |
| 7,650,376 B1 | 1/2010 | Blumenau | |
| 7,653,687 B2 | 1/2010 | Reisman | |
| 7,653,923 B2 | 1/2010 | Flickinger | |
| 7,668,963 B1 | 2/2010 | Miner et al. | |
| 7,702,995 B2 | 4/2010 | Sahota et al. | |
| 7,783,968 B2 | 8/2010 | Sahota et al. | |
| 7,930,631 B2 | 4/2011 | Sahota et al. | |
| 7,941,564 B2 | 5/2011 | Gebhardt et al. | |
| 7,958,457 B1 | 6/2011 | Brandenberg et al. | |
| 8,032,651 B2 | 10/2011 | Miner et al. | |
| 8,079,045 B2 | 12/2011 | Krapf et al. | |
| 8,296,792 B2 | 10/2012 | Sahota et al. | |
| 8,407,744 B2 | 3/2013 | Moon et al. | |
| 8,447,840 B1 | 5/2013 | Fong et al. | |
| 8,650,480 B2 | 2/2014 | Sahota et al. | |
| 8,667,387 B2 | 3/2014 | Sahota et al. | |
| 8,667,530 B2 | 3/2014 | Sahota et al. | |
| 8,935,719 B2 | 1/2015 | Sargent | |
| 8,973,056 B2 | 3/2015 | Ellis et al. | |
| 2001/0001160 A1 | 5/2001 | Shoff et al. | |
| 2001/0003212 A1 | 6/2001 | Marler et al. | |
| 2001/0003828 A1 | 6/2001 | Peterson et al. | |
| 2001/0011265 A1 | 8/2001 | Cuan et al. | |
| 2001/0023436 A1 | 9/2001 | Srinivasan et al. | |
| 2001/0027491 A1 | 10/2001 | Terretta et al. | |
| 2001/0037500 A1 | 11/2001 | Reynolds et al. | |
| 2001/0047298 A1 | 11/2001 | Moore et al. | |
| 2001/0047518 A1 | 11/2001 | Sahota et al. | |
| 2001/0051031 A1 | 12/2001 | Hada et al. | |
| 2001/0054031 A1 | 12/2001 | Lee et al. | |
| 2001/0056460 A1 | 12/2001 | Sahota et al. | |
| 2002/0010928 A1 | 1/2002 | Sahota | |
| 2002/0011265 A1 | 1/2002 | Ganachaud | |
| 2002/0046237 A1 | 4/2002 | Yokokura | |
| 2002/0046273 A1 | 4/2002 | Lahr et al. | |
| 2002/0049749 A1 | 4/2002 | Helgeson et al. | |
| 2002/0056087 A1 | 5/2002 | Berezowski et al. | |
| 2002/0059644 A1 | 5/2002 | Andrade et al. | |
| 2002/0075403 A1 | 6/2002 | Barone et al. | |
| 2002/0104086 A1 | 8/2002 | Tomsen et al. | |
| 2002/0112237 A1 | 8/2002 | Kelts | |
| 2002/0131511 A1 | 9/2002 | Zenoni | |
| 2002/0136448 A1* | 9/2002 | Bortolussi | G06K 9/00234 382/164 |
| 2002/0138849 A1 | 9/2002 | Blackketter et al. | |
| 2002/0184627 A1 | 12/2002 | Alba et al. | |
| 2003/0023971 A1 | 1/2003 | Martinolich et al. | |
| 2003/0028873 A1* | 2/2003 | Lemmons | H04N 7/17318 725/36 |
| 2003/0131311 A1* | 7/2003 | McNamara | H04L 12/2856 714/809 |
| 2003/0149581 A1 | 8/2003 | Chaudhri et al. | |
| 2004/0006747 A1 | 1/2004 | Tyler | |
| 2004/0133910 A1 | 7/2004 | Gordon et al. | |
| 2005/0071877 A1 | 3/2005 | Navarro | |
| 2005/0108633 A1 | 5/2005 | Sahota et al. | |
| 2005/0108634 A1 | 5/2005 | Sahota et al. | |
| 2005/0108637 A1 | 5/2005 | Sahota et al. | |
| 2005/0114757 A1 | 5/2005 | Sahota et al. | |
| 2005/0132420 A1 | 6/2005 | Howard et al. | |
| 2005/0149968 A1* | 7/2005 | Konig | G06F 17/30802 725/32 |
| 2005/0193410 A1 | 9/2005 | Eldering | |
| 2005/0216932 A1 | 9/2005 | Danker | |
| 2005/0235318 A1 | 10/2005 | Grauch et al. | |
| 2006/0130120 A1 | 6/2006 | Brandyberry et al. | |
| 2006/0143655 A1 | 6/2006 | Ellis et al. | |
| 2006/0168624 A1* | 7/2006 | Carney | H04N 7/17318 725/51 |
| 2006/0173560 A1 | 8/2006 | Widrow | |
| 2006/0236342 A1 | 10/2006 | Kunkel et al. | |
| 2007/0091919 A1 | 4/2007 | Sandoval | |
| 2007/0130581 A1 | 6/2007 | Del Sesto et al. | |
| 2007/0136753 A1 | 6/2007 | Bovenschulte et al. | |
| 2007/0157249 A1 | 7/2007 | Cordray et al. | |
| 2007/0162961 A1 | 7/2007 | Tarrance et al. | |
| 2008/0010659 A1 | 1/2008 | Zenith | |
| 2008/0109843 A1 | 5/2008 | Ullah | |
| 2008/0215428 A1 | 9/2008 | Ramer et al. | |
| 2008/0319852 A1 | 12/2008 | Gardner et al. | |
| 2009/0119723 A1 | 5/2009 | Tinsman | |
| 2009/0193456 A1 | 7/2009 | Ahn et al. | |
| 2009/0199114 A1 | 8/2009 | Lewis et al. | |
| 2009/0217329 A1 | 8/2009 | Riedl et al. | |
| 2009/0254931 A1 | 10/2009 | Pizzurro et al. | |
| 2010/0161826 A1 | 6/2010 | Miner et al. | |
| 2010/0171741 A1 | 7/2010 | Brill et al. | |
| 2010/0174783 A1 | 7/2010 | Zarom | |
| 2010/0215340 A1 | 8/2010 | Pettit et al. | |
| 2010/0251279 A1 | 9/2010 | Piard et al. | |
| 2010/0268773 A1 | 10/2010 | Hunt et al. | |
| 2010/0309196 A1 | 12/2010 | Castleman | |
| 2010/0332315 A1 | 12/2010 | Kamar et al. | |
| 2010/0333153 A1 | 12/2010 | Sahota et al. | |
| 2011/0119478 A1* | 5/2011 | Jackson | G06F 9/505 713/100 |
| 2011/0191667 A1 | 8/2011 | Sahota et al. | |
| 2012/0041825 A1 | 2/2012 | Kasargod et al. | |
| 2012/0084812 A1 | 4/2012 | Thompson et al. | |
| 2012/0117584 A1 | 5/2012 | Gordon | |
| 2012/0189272 A1 | 7/2012 | Kunigita et al. | |
| 2013/0014192 A1 | 1/2013 | Sahota et al. | |
| 2013/0051770 A1 | 2/2013 | Sargent | |
| 2013/0117406 A1 | 5/2013 | Chevillat et al. | |
| 2013/0144725 A1 | 6/2013 | Li et al. | |
| 2013/0173742 A1 | 7/2013 | Thomas et al. | |
| 2013/0179925 A1 | 7/2013 | Woods et al. | |
| 2013/0205343 A1 | 8/2013 | Kirby | |
| 2013/0325603 A1 | 12/2013 | Shamir et al. | |
| 2014/0018033 A1 | 1/2014 | Luna | |
| 2014/0053223 A1 | 2/2014 | Vorobyov et al. | |
| 2014/0130085 A1 | 5/2014 | Sahota et al. | |
| 2014/0181855 A1 | 6/2014 | Fife et al. | |
| 2014/0189500 A1 | 7/2014 | Sahota et al. | |
| 2014/0201769 A1 | 7/2014 | Neumeier et al. | |

(56) References Cited

U.S. PATENT DOCUMENTS

| 2014/0282653 | A1 | 9/2014 | Ariantaj et al. |
| 2014/0282735 | A1 | 9/2014 | Davis et al. |
| 2014/0379855 | A1 | 12/2014 | Sahota et al. |
| 2015/0156564 | A1 | 6/2015 | Sargent |
| 2015/0256903 | A1 | 9/2015 | Walker |

FOREIGN PATENT DOCUMENTS

| EP | 0942595 | A2 | 9/1999 |
| EP | 1269750 | A1 | 1/2003 |
| EP | 1286541 | A1 | 2/2003 |
| EP | 1381961 | A1 | 1/2004 |
| EP | 1826981 | A1 | 8/2007 |
| EP | 1954054 | A1 | 8/2008 |
| WO | 2000078043 | A1 | 12/2000 |
| WO | 2001058159 | A1 | 8/2001 |
| WO | 01/82614 | A1 | 11/2001 |
| WO | 0182613 | A1 | 11/2001 |
| WO | 2002086746 | A1 | 10/2002 |
| WO | 03017129 | A1 | 2/2003 |
| WO | 2005006758 | A1 | 1/2005 |

OTHER PUBLICATIONS

Extended European Search Report—EP12181319—dated Dec. 19, 2012.
"Spyglass Prism: Concepts and Applications", Spyglass Inc, 1997, pp. 1-8.
Puder, A., et al, "Position Papers: System Support for Knowledge-Based Trading in Open Service Markets", Proceedings of the 7th Workshop on ACM SIGOPS European Workshop: Systems Support for Worldwide Applications, Sep. 1996, pp. 289-296.
Ensink, Brian, et al, "XML Based Adaptation of the Composite Approach for Database Integration", Proceedings of the 37th Annual Southeast Regional Conference (CD-ROM), Apr. 1999, pp. 1-6.
Arens, Yigal, et al, "Intelligent Caching: Selecting, Representing, and Reusing Data in an Information Server", Proceedings of the Third International Conference on Information and Knowledge Management, Nov. 1994, pp. 433-438.
Spencer, Ken, "Using XML to Build Internet Solutions", Windows IT Pro, http://www.winntmag.com/Articles/Print.cfm?ArticleiD=5056, Apr. 1999.
Bayardo, R J., et al., "InfoSieuth: Agent-Based Semantic Integration of Information in Open and Dynamic Environments", ACM SIGMOD Record, (Jun. 1997), vol. 26, Issue 2, pp. 195-206.
Calvary, Gaelle, et al., "From Single-User Architectural Design to PAC: a Generic Software Architecture Model for CSCW", Proceedings of the SIGCHI Conference on Human Factors in Computing Systems, (Mar. 1997), pp. 342-349.
Wegner, Lutz, et al, "Applications: A Visual Interface for Synchronous Collaboration and Negotiated Transactions", Proceedings of the Workshop on Advanced Visual Interfaces, May 1996, pp. 156-165.
Bulterman, Dick C., "Embedded Video in Hypermedia Documents: Supporting Integration and Adaptive Control", ACM Transactions on Information Systems (TOIS), vol. 13, Issue 4, Oct. 1995, pp. 440-470.
Hijiri, Toshiki, et al, "A Spatial Hierarchical Compression Method for 3D Streaming Animation", Proceedings of the Fifth Symposium on Virtual Reality Modeling Language (Web3D-VRML), Feb. 2000, pp. 95-101.
Glushko, Robert J., et al, "An XML Framework for Agent-Based E-Commerce", Communications of the ACM, vol. 42, No. 3, Mar. 1999, pp. 106-114.
Claypool, Kajal, et al., "OQL_SERF: An ODMG Implementation of the Template-Based Schema Evolution Framework", Proceedings of the 1998 Conference of the Centre for Advanced Studies on Collaborative Research, (Nov. 1998), pp. 1-15.
Fraisse. S, et al., "Generating Hypermedia Form Specifications by Sketching Multimedia Templates", ACM, (1996), pp. 353-363.
Iyengar, Arun, et al., "Improving Web Server Performance by Caching Dynamic Data", proceedings of the US EN IX Symposium on Internet Technologies and Systems, (Dec. 1997), pp. 1-13.
Puerta, Angel, et al., "Towards a General Computational Framework for Model-Based Interface Development", Proceedings of the 4th International Conference on Intelligent User Interfaces, (Dec. 1998), pp. 171-178.
Shim, Simons., et al., "Template Based Synchronized Multimedia Integration Language Authoring Tool", SPIE Conference on Internet Imaging, (Dec. 1999), vol. 3964, pp. 134-142.
"XHTML 1.0: The Extensible HyperText Markup Language, A Reformulation of HTML 4.0 in XML 1.0", www.w3.org, downloaded from http://www.w3.org!TR/19991WD-html-in-xml-199902241, Feb. 24, 1999, pp. 1-15.
Barta, Robert, et al, "Syndication with JML", Proceedings of the 2000 ACM Symposium on Applied Computing—vol. 2, ACM Press, Mar. 2000, pp. 962-970.
Kuchling, Andrew, "XML, the eXtensible Markup Language", Linux Journal, Specialized Systems Consultants, Inc., Nov. 1998, pp. 1-3.
Microsoft Computer Dictionary, Third Edition, Microsoft Press, 1997. p. 505.
Smith, John R., et al. "Scalable Multimedia Delivery for Pervasive Computing", Proceedings of the Seventh ACM International Conference on Multimedia (Part 1), Oct. 1999, pp. 131-140.
Microsoft Computer Dictionary, Third Edition, Microsoft Press, 1997, p. 368.
International Preliminary Examination Report, PCT/US01/13244, dated Feb. 18, 2003 (11 pages).
"Advanced Television Enhancement Forum Specification (ATVEF)", ATVEF, 34 pages, Feb. 2, 1999.
Palmer, Jonathan W., et al, "Digital Newspapers Explore Marketing on the Internet", Communications of the ACM, vol. 42, Issue 9, Sep. 1999, pp. 32-40.
Hodes, Todd D., et al, "Composable Ad Hoc Location-Based Services for Heterogeneous Mobile Clients", Wireless Networks, vol. 5, Issue 5, Oct. 1999, pp. 411-427.
International Search Report for International Application No. PCTIUS01/13244 (Metatv, Inc.), dated Sep. 10, 2001.
International Search Report for International Application No. PCT/US01/13243 (Metatv, Inc.) dated Oct. 10, 2001.
Steinhorn, Jason and Mark Kohler, "Enhancing TV With ATVEF" Embedded Systems Programming, Oct. 1999, pp. 55-64.
International Search Report for International Application No. PCT/US01/13241 (Metatv, Inc.), dated Sep. 10, 2001.
Advanced Television Systems Committee, Inc., "ATSC Standard: Programming Metadata Communication Protocol, Revision B," Document A/76B, 52 pages (Jan. 14, 2008).
Heather Wilner, "Verizon FiOS Brings You the 2012 London Summer Olympic Games," 3 pages, available at <http://forums.verizon.com/t5/Verizon-at-Home/Verizon-FiOS-Brings-You-the-2012-London-Summer-Olympic-Games/ba-p/462267> (Jul. 23, 2012, accessed Mar. 5, 2014).
Extended European Search Report—EP 14159424.2—dated May 13, 2014.
Extended European Search Report—EP Appl. 15158005.7—dated Jul. 29, 2015.
European Office Action—EP App 14159424.2—dated Sep. 27, 2016.
May 14, 2018—Canadian Office Action—CA 2,787,562.
Sep. 17, 2018—European Office Action—EP 15158005.7.
Oct. 30, 2018—European Summons to Oral Proceedings—EP 14159424.2.
Feb. 8, 2019—Canadian Office Action—2,787,562.
Oct. 8, 2019—Canadian Office Action—CA 2,787,562.
May 25, 2020—Canadian Office Action—CA 2,787,562.

\* cited by examiner

APPLICATION TRIGGERING

BACKGROUND

Advancements in technology have changed the way users consume and interact with content and other users. For example, a user might not want to be restricted to a passive viewing experience, and may want to interact with content or other users. Interactive television and applications are examples allowing users to interact with one another and with content.

Traditional techniques for providing or running applications or interactive content may be prone to error, and improvements are needed.

SUMMARY

This summary is not intended to identify critical or essential features of the disclosure provided herein, but instead merely summarizes certain features and variations thereof.

In some illustrative embodiments, an application author or provider may specify one or more frames of a content item that is to be associated with an application trigger. Frames associated with the content item may be monitored to determine whether a frame associated with an application trigger is being transmitted to a user device. If a frame associated with an application trigger is being transmitted to a user device, the application trigger may be transmitted to and/or executed at the user device.

In some embodiments, a device (e.g., a streamer device) may decode and monitor frames received with a feed (e.g., a video feed). The streamer may use a comparison algorithm (e.g., an image comparison algorithm) to determine if a current frame matches a frame corresponding to a trigger. If there is a match, a trigger may be transmitted. In some embodiments, the determination of whether a match exists may be based on one or more thresholds or tolerances.

In some embodiments, an event associated with a trigger may execute until a condition occurs. The condition may comprise a receipt of a "cancel" frame. The condition may comprise an expiration of the trigger for the content.

In some embodiments, frame-based trigger techniques may be used in combination with time-based trigger techniques or other techniques.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Various connections between elements are discussed in the following description. These connections are general and, unless specified otherwise, may be for example direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
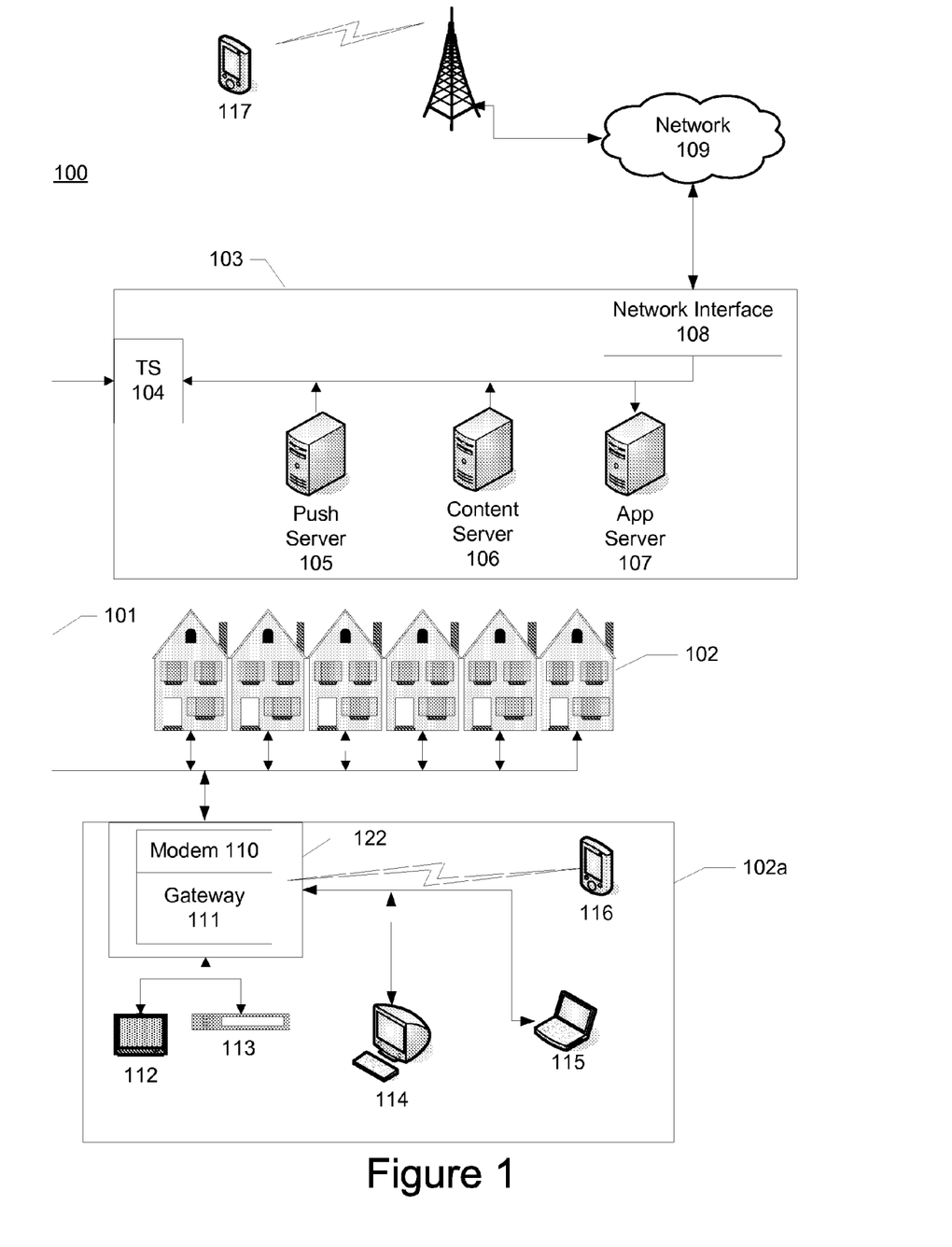
FIG. 1 illustrates an example distribution network.

FIG. 1 illustrates an example information (e.g., content) distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS) in some types of networks, which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream communications lines and/or frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include or have access to a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102a may include an interface device 122. In one aspect, the interface device 122 may comprise a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The interface device 122 may also be connected to, or be a part of, a gateway interface device 111. The gateway interface device 111 may be a computing device that communicates with the modem 110 to allow one or more other devices in the premises 102a to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the premises 102a, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
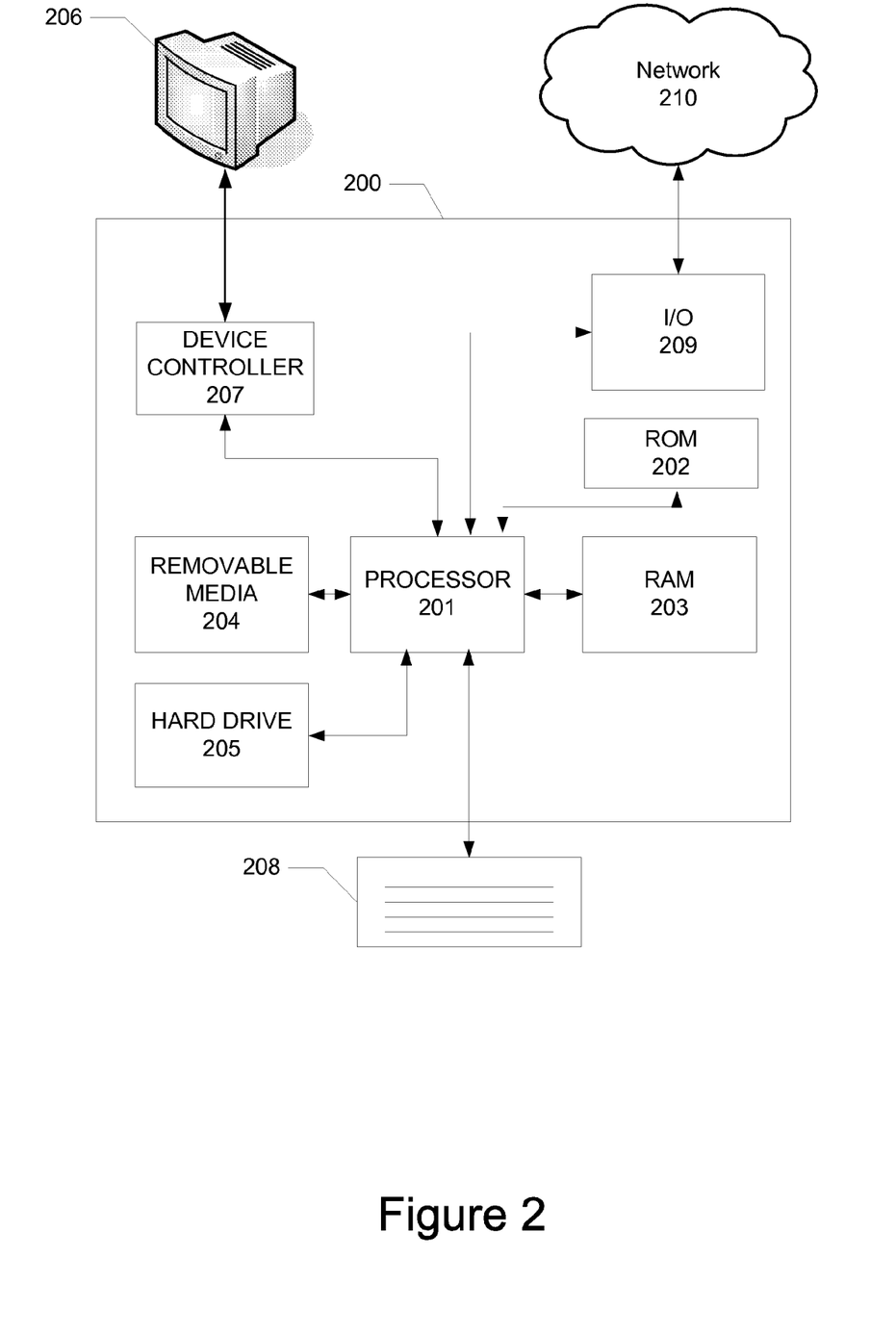
FIG. 2 illustrates an example platform on which the various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in one or more of a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

This disclosure identifies and addresses an issue associated with absolute-time-based triggers. For example, if a trigger that causes an application to provide an output or stimulus (e.g., an interactive poll) to a user is specified as being transmitted or executed at an absolute time (e.g., 10:28 AM on Sunday) based on a scheduled transmission of content, and then a scheduling change causes the content to be transmitted at a time different from what was initially specified, an event associated with the trigger may execute at an unintended time. In other words, due to a change in the scheduled transmission of the content, the trigger might not be synchronized to the underlying content.

To address the above-noted problem/issue related to absolute-time-based triggers, relative triggering may be used. In relative triggering, an application author/provider may specify that a trigger is to be transmitted or executed at a time that is offset relative to a reference time associated with the content (e.g., the start or end of the content). In this manner, even if the transmission of the content changes relative to an initial schedule, the trigger may be synchronized with the content. Relative triggering might be counter-intuitive from an application author or provider's perspective. For example, an application author or provider may have to engage in a time-consuming trial-and-error process to determine the appropriate location or spot in the content to which the trigger should be associated. Aspects of this disclosure may address problems/issues associated with relative triggering.

Aspects of this disclosure may be implemented to synchronize one or more application triggers to one or more content items (e.g., television programs, advertisements, movies, computer programs, text files, audio files (i.e., music), etc.). An application authoring process may be streamlined and more intuitive using one or more of the techniques described herein.

Figure 3:
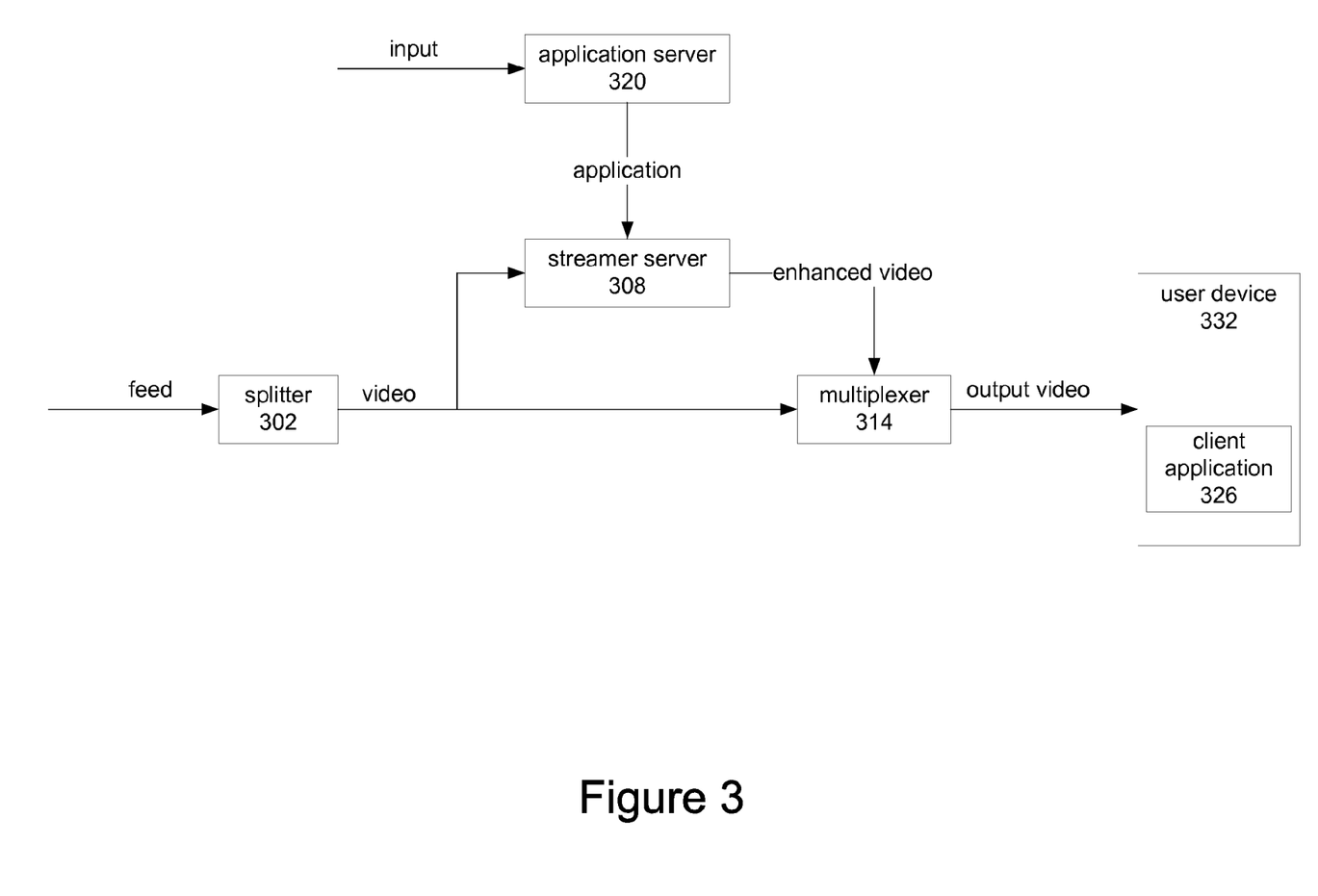
FIG. 3 illustrates an environment suitable for demonstrating one or more aspects of this disclosure.

FIG. 3 illustrates an environment suitable for demonstrating one or more aspects of this disclosure. In some embodiments, the devices and methods shown and described in connection with FIG. 3 may be implemented using one or more of the components and devices described above in connection with FIGS. 1-2.

As shown in FIG. 3, a device such as a splitter 302 may receive a feed, such as a content feed from one or more sources. In some embodiments, the feed may be generated by, for example, a broadcast source or a narrowcast source (e.g., a multicast source or a unicast source). For purposes of illustrative simplicity, the feed is discussed below as pertaining to video. Alternatively, or additionally, other types of content or data may be used or included in some embodiments. Splitter 302 may generate or output video, which may be provided to a streamer server 308 and a multiplexer 314.

Also shown in FIG. 3 is an application server 320. Server 320, or another computing device, may receive an input that may specify or identify one or more frames, or an identification of a point in time within a piece of content, to be associated with a trigger for a particular application or group of applications, for example. The input may be generated by, or received from, a user, a network operator, a content creator, an independent developer, etc. The specified or identified frame(s) may, for example, coincide with one or more frames of video output by splitter 302. Server 320 may access or generate an application, such as an enhanced television (ETV) application, and output the application. The application output by server 320 may include one or more triggers. In some embodiments, a trigger may be embedded in an application. For example, multiplexing may be used to embed a trigger in an application. In some embodiments, a trigger may be sent or transmitted separate from an application. The application output by server 320 may also include video frame information. The application may adhere to one or more standards, specifications, or protocols, such as TRU2WAY/OCAP, Enhanced TV Binary Interchange Format (EBIF), ETV Integrated Signaling Stream (EISS), etc.

Streamer server 308, or another computing device, may monitor video from splitter 302 for one or more frames that may correspond to one or more frames that may be specified via the input to server 320 (and included in the application output by server 320). In some embodiments, streamer server 308 may include comparison logic, circuits, or software to facilitate a comparison between one or more frames included in the video and the specified one or more frames included in the application. In some embodiments, the frame comparison may take place on a pixel-by-pixel basis. In some embodiments, color comparison techniques may be used. In some embodiments, macro block level techniques may be used. For example, in some embodiments, MPEG video streams may be encoded using macro blocks. If a certain (e.g., a predetermined) number of macro blocks correspond or "agree," it may be concluded that a test frame matches a reference frame. In some embodiments, "facial recognition" techniques may be used. In some embodiments, hashing/"fuzzy" recognition algorithms, such as eigenvectors, may be used. In some embodiments, open source techniques (such as those used in a comparison of audio) may be used. In some embodiments, off-the-shelf components or circuits may be used to facilitate the frame comparison.

In some embodiments, a comparison performed by streamer server 308 may be based at least in part on a predetermined tolerance or threshold to determine whether a match exists. For example, if a frame of video output by splitter 302 is within y% of a frame specified in the application output by server 320, then a match may be said to exist. In some embodiments, other criteria (e.g., other imaging criteria) may be used to determine whether a match exists. For example, in some embodiments, rather than determining whether a particular frame matches, a portion of a frame may be examined to determine whether a match exists. For example, if a logo or other graphic (e.g., a particular score associated with a particular football game) is included in a particular frame, that may suffice as a match.

When a match is found to exist (e.g., when one or more frames included in the video correspond to one or more frames specified in the application, optionally within one or more thresholds or tolerances), streamer server 308 may generate a trigger to signal that a client application 326 running at a user device 332, for example, should perform some function or activity. For example, a trigger may signal the client application 326 that user device 332 should display a menu, play a ring tone, transmit a message, launch a website (e.g., a social networking website), launch an advertisement (e.g., a commercial), etc.

As an example involving advertisements, a computing device (e.g., streamer server 308) may detect a frame with an actor drinking a particular brand of soda. In response to such a detection, an interactive advertisement related to the actor and/or the soda may be launched.

In some embodiments, a trigger may be a "do-it-now" type of trigger, such that the client application 326 and/or user device 332 performs whatever task is associated with the trigger upon receipt of the trigger. Alternatively, or additionally, the trigger may include a specification of an offset. The offset may be based on time or frames, for example. For example, the trigger may specify that the client application 326 and/or user device 332 should perform a task 'x' minutes after receipt of the trigger, where 'x' is a number. The offset may be based on an event. For example, the trigger may specify that the client application 326 and/or user device 332 should perform a task after receiving one or more user inputs at device 332.

In some embodiments, a trigger may specify that the client application 326 should cease running or executing. For example, if a frame is received that indicates that a particular show or program is ending (e.g., a frame corresponds to the credits that are displayed at the end of a television show or movie), a cancel-trigger may be generated to indicate that any applications related to that show or program should be terminated. In some embodiments, a cancel-trigger may be generated based on time, such as absolute time. For example, a cancel-trigger based on time may be used to ensure that an application terminates at a specified time. In an illustrative scenario, a cancel-trigger based on time may be used to ensure that an application suitable for an adult audience terminates at 6 AM when children are expected to first start waking up from a given night's sleep.

In some embodiments, an action different from terminating an application may be taken in response to a cancel-trigger. For example, and referring to the above-described scenario related to children waking up at 6 AM, an application may replace adult-themed displayed data with "child-friendly" displayed data starting at 6 AM in response to receiving a cancel-trigger or another trigger.

Various types of triggers may be used in some embodiments. Various triggers, or types of triggers, may be combined in some embodiments. For example, in some embodiments, "stacked" triggers may be used. The stacked triggers may be based on a particular combination or sequence of frames, occurring presently or in the future. For example, if frame 'X' is detected, application #1 may be launched, whereas if frame 'Y' is detected, application #2 may be launched. The stacked triggers may be configured to support any level or degree of complexity or specificity. As yet another illustrative example using stacked triggers, logic (e.g., at server 320 or 308) may specify that if frame 'Z' and frame 'A' are detected, and frame 'B' is not detected, some action or task is to be performed. Alternatively, or additionally, the logic may specify that if frame 'Z' is present, capture the frame that is some specified amount of time before or after frame 'Z'—if that earlier or later frame is frame 'C', then perform some action or task.

In some embodiments, a rules engine may be used to determine what action, task or event should be triggered in response to a detected frame or combination/sequence of frames. The rules engine may be in servers 320 or 308, or in another computing device.

Streamer server 308 may generate or output enhanced video. Enhanced video may comprise video, applications, or triggers, or any combination thereof, in some embodiments. The enhanced video output by streamer server 308 may include triggers generated by the streamer server 308 as described above. The enhanced video output by streamer server 308 may include a "blue-screen" or "dummy video" as those terms are understood in the art. The blue-screen or dummy video may be used to facilitate trouble-shooting by a technician or other operator. The enhanced video output by streamer server 308 may include timing information. The timing information may be used to align or synchronize data (e.g., triggers) to video that is received at multiplexer 314.

Multiplexer 314 or another computing device may combine the video received from splitter 302 with the enhanced video received from server 308 to generate output video. In some embodiments, the output video from multiplexer 314 may correspond to an enhanced MPEG stream. In some embodiments, multiplexer 314 may discard a blue-screen or dummy video that may be included in the enhanced video received from server 308 when performing the combination. In some embodiments, multiplexer 314 may transmit the output video to user device 332 or another point in a network.

In some embodiments, multiplexer 314 may transmit the enhanced video (e.g., the triggers or application data) via in-band communications. For example, if an application is geared or directed to a particular channel or particular content (e.g., an application relates to a game show that is televised on a particular channel), then the use of in-band communications may ensure that the application cannot be accessed from other channels. In some embodiments, multiplexer 314 may transmit the enhanced video (e.g., the triggers or application data) via out-of-band communications. Out-of-band communications may be used, for example, when an application is intended to be available for use irrespective of a channel or content selection by a user—an example may relate to an electronic programming guide (EPG) or other general information, where data for an EPG application may be desirable irrespective of what program or channel a user has currently selected.

The architecture described above is illustrative. In some embodiments, components and devices shown in FIG. 3 might not be included. In some embodiments, additional components and devices not shown in FIG. 3 may be included. For example, routers may be located between multiplexer 314 and user device 332 to facilitate the transmission of video and triggers from multiplexer 314 to user device 332. Also, while a single user device 332 is shown, in some embodiments any number of user devices may be included. In some embodiments, a number of user devices may be grouped into one or more service groups.

In some embodiments, functionality described above with respect to each of the components or devices may be partially or completely reallocated to other devices in some embodiments. For example, a comparison that may be performed by streamer server 308 as described above may be performed at user device 332, and as such, triggers may be internally generated within user device 332 or another associated device. Such a (re)allocation of functionality may be suited to user devices with greater processing capabilities, such as next generation set-top boxes or gateways. In such embodiments, one or more reference frames may be transmitted to the user device 332. In some embodiments, a "hash" or "digest" of the one or more reference frames may be transmitted to the user device 332. Use of a "hash" or "digest" may help to preserve bandwidth (e.g., downstream transmission bandwidth).

In some embodiments, streamer server 308 and multiplexer 314 may be combined into a single unit, casing, or housing. However, maintaining streamer server 308 and multiplexer 314 as separate or distinct entities may be beneficial. For example, multiplexer 314 may correspond to an off-the-shelf type of component that may have legacy properties or characteristics associated with it. In this regard, maintaining streamer server 308 and multiplexer 314 as separate or distinct entities may provide benefits in terms of lower costs by allowing a network or service provider to take advantage of economies of scale in terms of components or devices by leveraging existing infrastructure.

A network or service provider may prefer to maintain isolation or independence between the enhanced video or application data (shown as having been generated by streamer server 308 in FIG. 3) and the video (shown as having been output by splitter 302 in FIG. 3) for as long as possible. For example, maintaining independence between the video and the enhanced video until they are received at multiplexer 314 may facilitate trouble-shooting activities in the event of component or device failure. Furthermore, the network or service provider may want to ensure that the video that is associated with the output video produced by multiplexer 314 can be provided to the user device 332 irrespective of application data (e.g., triggers) that may be included in the enhanced video—this may be particularly true when the application or the enhanced video is generated by a third-party developer, and/or when the network or service provider has limited control over the application or the enhanced video. Maintaining isolation or independence between the enhanced video and the video (or other data) may help to ensure that at least the video is provided to the user device 332 if the enhanced video has design bugs or flaws associated with it, or fails in some other way.

Figure 4:
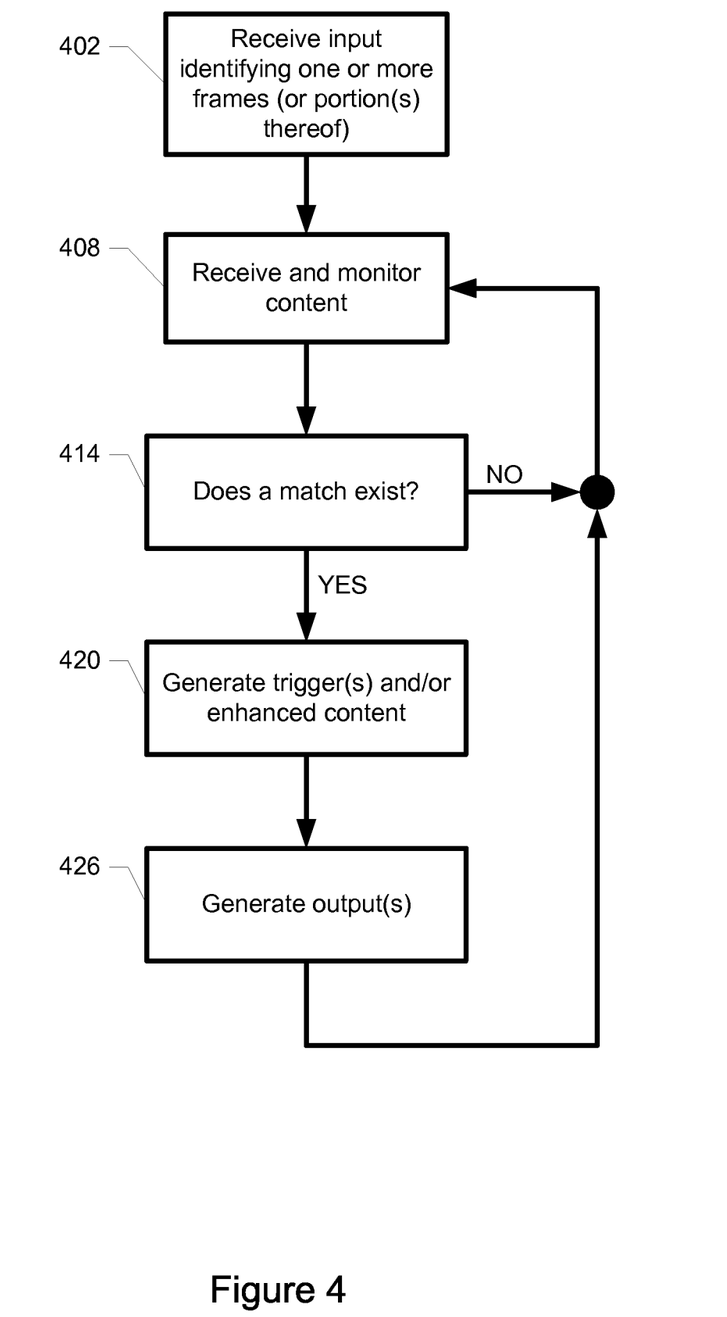
FIG. 4 illustrates a method suitable for demonstrating one or more aspects of this disclosure.

FIG. 4 illustrates an example method that may be used to implement one or more aspects of this disclosure. The method may be operative on any number of environments or architectures, such as the environments and architectures described above with respect to FIGS. 1-3. The method may be adapted to suit various environments and architectures.

In step 402, an input identifying one or more frames (or one or more portions thereof) may be received. The input may serve to identify that an event or an action should be taken by one or more applications running or executing at a device, such as a user device relative to the one or more frames, for example.

In step 408, one or more feeds or representations thereof may be received. In some embodiments, the one or more feeds may include audio content (e.g., music, a siren), visual content (e.g., a text file, a presentation, etc.), audio/visual content (e.g., a television show or program), or other data.

In step 414, a comparison may take place to determine whether a match exists. For example, a match may exist if a frame included in the feed received in connection with step 408 corresponds to a frame identified in connection with step 402. In some embodiments, tolerances or thresholds may be used to determine whether a match exists. For example, a match may exist if a frame included in the feed received in connection with step 408 corresponds to a frame identified in connection with step 402 within y%. In some embodiments, the comparison or detection may be based on one or more "audio" frames. For example, audio may be monitored for a particular sequence of sounds. In the context of a football game, audio corresponding to the play-by-play may be monitored for a statement similar to (e.g., within a threshold of): "Team 'GHI' just scored a field goal—3 points!"

In some embodiments, the comparison or determination associated with step 414 may be associated with a timeout or expiration. Continuing the above example, if the football game has ended, or team GHI does not have possession of the ball, the monitoring may be stopped or cutoff so as to reduce the likelihood that a "false positive" will be triggered in response to a "similar enough" frame being detected (e.g., in another show, or as a result of team 'JKL' having scored a field goal).

If a match does not exist (e.g., the NO path is taken out of step 414), then the method flow may proceed (back) to step 408 to continue receiving and monitoring the feed. In this respect, a loop may be established to monitor a received feed until a match occurs.

If a match does exist (e.g., the YES path is taken out of step 414), then the method flow may proceed to step 420. In step 420, one or more triggers may be generated or otherwise associated with the frames or content. The one or more triggers may be of any type or combination of types. The one or more triggers may direct a client application executing or running at a device (e.g., a user device) to take one or more actions. As part of step 420, enhanced video may be generated. The enhanced video may include the one or more triggers. The enhanced video may include a blue-screen or dummy video. The enhanced video may include timing information. Referring to the example provided above regarding monitoring audio play-by-play for a team GHI field goal, in response to having detected the field goal, a pop-up box may be generated, transmitted, and/or displayed that provides statistics regarding team GHI (e.g., team GHI's placekicker's accuracy on field goal attempts from various distances).

In step 426, one or more outputs may be generated. The one or more outputs may include video in some embodiments. The one or more outputs may include a combination (e.g., multiplexing) of content and triggers in some embodiments. As part of step 426, the generated output(s) may be transmitted to one or more devices, such as one or more user devices. The method flow may return to step 408 for purposes of continuing to monitor the received feed.

The method described above in connection with FIG. 4 is illustrative. In some embodiments, some of the steps (or portions thereof) may be optional. In some embodiments, the order of the steps (or portions thereof) may be rearranged or executed in a sequence different from what is shown. In some embodiments, one or more of the steps (or portions thereof) may execute in parallel. In some embodiments, additional steps not shown may be included.

While some examples have been described above in the context of television technology and communications, aspects of this disclosure may readily be applied to, and adapted to be operative on, one or more other communication systems. Those communication systems may include computer networks, satellite networks, cellular networks, and the like.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware, and/or hardware. The functionality may be resident in a single computing device or application, or may be distributed across multiple computing devices/platforms or applications, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.). As described herein, one or more triggers may be generated in response to one or more frames (or one or more portions of one or more frames) matching a frame (or portion thereof), optionally within a specified threshold or tolerance. In this manner, applications may be authored or provided in an easy and intuitive way.

The methodological acts and processes described herein may be tied to particular machines or apparatuses. For example, as described herein, applications may execute on one or more devices, such as servers and user devices. The applications may be formatted in accordance with one or more communication techniques, specifications, types, or protocols. More generally, one or more apparatuses may include one or more processors and memory storing instructions, that when executed, cause the one or more apparatuses to perform the methodological acts and processes described herein. Furthermore, the methodological acts and processes described herein may perform a variety of functions including transforming an article (e.g., a feed, such as a content feed, and an application, such as a client application) into a different state or thing (e.g., content supplemented by an application with triggers based at least in part on a determination that a frame matches a specified frame, optionally within a given tolerance or threshold).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

What is claimed is:

1. A method comprising:
causing, by a computing device, a comparison of a trigger for an advertisement and at least one content frame in a stream, wherein the comparison comprises determining whether a first plurality of predetermined pixels corresponding to the trigger for the advertisement and a subset of a second plurality of pixels of the at least one content frame match based on a predetermined threshold;
determining, based on the comparison, that a match exists between the at least one content frame and the trigger for the advertisement; and
inserting, based on determining that the match exists, the trigger for the advertisement into the stream.

2. The method of claim 1, wherein the comparison further comprises comparing first audio associated with the trigger for the advertisement with second audio associated with the at least one content frame.

3. The method of claim 1, wherein the advertisement is an application, and wherein the trigger causes the application to execute.

4. The method of claim 1, wherein the advertisement is associated with a particular channel, and wherein the trigger is inserted into a portion of the stream associated with the particular channel.

5. The method of claim 1, wherein the comparison further comprises comparing the first plurality of predetermined pixels with the subset of the second plurality of pixels using a fuzzy recognition algorithm.

6. The method of claim 1, wherein the comparison further comprises:
determining, using facial recognition techniques, a face in the at least one content frame;
and determining that the face corresponds to an individual associated with the advertisement.

7. A method comprising:
receiving, by a computing device, a content feed;
receiving an advertisement comprising a trigger that causes the advertisement to be presented;
causing a comparison of the trigger and at least one content frame of the content feed, wherein the comparison comprises determining whether a first plurality of predetermined pixels corresponding to the trigger and a subset of a second plurality of pixels of the at least one content frame match based on a predetermined threshold;
determining, based on the comparison, that a match exists between the trigger and the at least one content frame; and
inserting, based on determining that the match exists, the trigger into the content feed.

8. The method of claim 7, wherein the advertisement is an application, and wherein the trigger causes the application to execute.

9. The method of claim 7, wherein receiving the advertisement comprising the trigger further comprises receiving enhanced video comprising the advertisement, and wherein inserting the trigger into the content feed comprises combining the content feed and the enhanced video.

10. The method of claim 7, wherein the predetermined threshold comprises a percentage difference between the first plurality of predetermined pixels and the subset of the second plurality of pixels.

11. The method of claim 7, wherein the content feed comprises timing information for the trigger.

12. The method of claim 7, wherein the comparison further comprises comparing a first hash of the trigger and a second hash of the at least one content frame.

13. The method of claim 12, wherein comparing the first hash of the trigger and the second hash of the at least one content frame comprises determining that the first hash and the second hash match based on a predetermined tolerance.

14. The method of claim 12, wherein comparing the first hash of the trigger and the second hash of the at least one content frame comprises determining that the first hash and the second hash match using one or more eigenvectors.

15. The method of claim 7, further comprising:
generating video frame information associated with advertisement information corresponding to the advertisement, wherein inserting the trigger into the content feed further comprises inserting the video frame information into the content feed.

16. A method comprising:
receiving, by a computing device, an input comprising one or more reference frames, wherein the input is associated with one or more advertisements;
receiving one or more feeds, the one or more feeds comprising one or more of audio content, visual content, or audiovisual content;
causing a comparison of one or more content frames of the one or more feeds with the one or more reference frames, wherein the comparison comprises determining whether a first plurality of predetermined pixels corresponding to a trigger for the one or more advertisements and a subset of a second plurality of pixels of the one or more content frames match based on a predetermined threshold;
associating, based on determining that a metric associated with the comparison satisfies a threshold, the trigger with the one or more content frames, wherein the trigger causes presentation of the one or more advertisements; and
transmitting an enhanced video comprising the trigger and the one or more feeds.

17. The method of claim 16, wherein the enhanced video comprises the one or more advertisements.

18. The method of claim 16, wherein the comparison further comprises comparing a first hash of the one or more reference frames and a second hash of the one or more content frames.

19. The method of claim 2, wherein of the comparison further comprises comparing a first hash of the trigger for the advertisement and a second hash of the at least one content frame.

20. The method of claim 1, wherein the first plurality of predetermined pixels corresponds to at least one reference frame, and wherein the at least one reference frame is associated with the trigger for the advertisement.

* * * * *

UNITED STATES PATENT AND TRADEMARK OFFICE
CERTIFICATE OF CORRECTION

| | |
|---|---|
| PATENT NO. | : 10,735,805 B2 |
| APPLICATION NO. | : 15/276135 |
| DATED | : August 4, 2020 |
| INVENTOR(S) | : Sargent |

It is certified that error appears in the above-identified patent and that said Letters Patent is hereby corrected as shown below:

In the Claims

Column 11, Claim 6, Line 34:
After "frame;", insert --and--

Column 11, Claim 6, Line 35:
Before "determining", delete "and"

Column 12, Claim 19, Line 52:
Delete "claim 2," and insert --claim 1,-- therefor Column 12, Claim 19, Line 52:
After "wherein", delete "of"

Signed and Sealed this
Thirteenth Day of December, 2022

*Katherine Kelly Vidal*

Katherine Kelly Vidal
*Director of the United States Patent and Trademark Office*